(12) United States Patent
Sugimoto

(10) Patent No.: US 6,908,102 B2
(45) Date of Patent: Jun. 21, 2005

(54) AIRBAG APPARATUS

(75) Inventor: Shinichi Sugimoto, Hikone, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/697,284

(22) Filed: Oct. 31, 2003

(65) Prior Publication Data

US 2004/0090052 A1 May 13, 2004

(30) Foreign Application Priority Data

Nov. 1, 2002 (JP) .................................... 2002-319996
Sep. 18, 2003 (JP) .................................... 2003-326409

(51) Int. Cl.[7] ............................................. B60R 21/16
(52) U.S. Cl. ............................... 280/728.2; 280/728.3; 280/731
(58) Field of Search ........................... 280/731, 728.2, 280/728.3, 728.1; 200/61.54, 61.55

(56) References Cited

U.S. PATENT DOCUMENTS 6,257,615 B1 * 7/2001 Bohn et al. ............... 280/728.2
6,517,099 B2 * 2/2003 Igawa et al. .............. 280/728.2

FOREIGN PATENT DOCUMENTS

| EP | 1 074 435 A2 | 2/2001 |
|---|---|---|
| JP | 09-030425 A | 2/1997 |
| JP | 09-183350 A | 7/1997 |
| JP | 10-100832 A | 4/1998 |
| JP | 2001-206184 A | 7/2001 |
| JP | 2001-260794 A | 9/2001 |
| JP | 2001-341605 A | 12/2001 |

* cited by examiner

Primary Examiner—Eric Culbreth
(74) Attorney, Agent, or Firm—Foley & Lardner LLP

(57) ABSTRACT

An airbag apparatus includes an airbag; a retainer to which the airbag is attached; a module cover which covers the airbag, which can move backward toward the retainer, and which has a projecting portion on the back surface thereof; and horn switches which are turned on when the module cover moves backward. A reinforcing member is attached to the projecting portion, the reinforcing member having protruding tabs which are continuous with the reinforcing member and which face the back surface of the module cover at a peripheral region around the projecting portion. In addition, the retainer has brackets which extend from the retainer and which face the protruding tabs, and the horn switches are interposed between the protruding tabs and the brackets.

7 Claims, 5 Drawing Sheets

FIG. 5
(a)
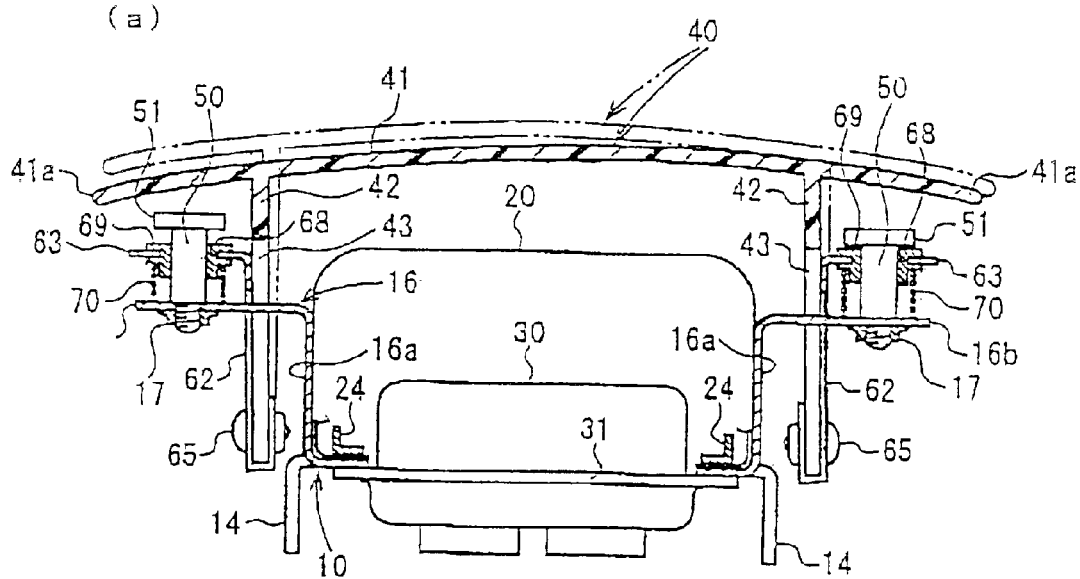
(b)
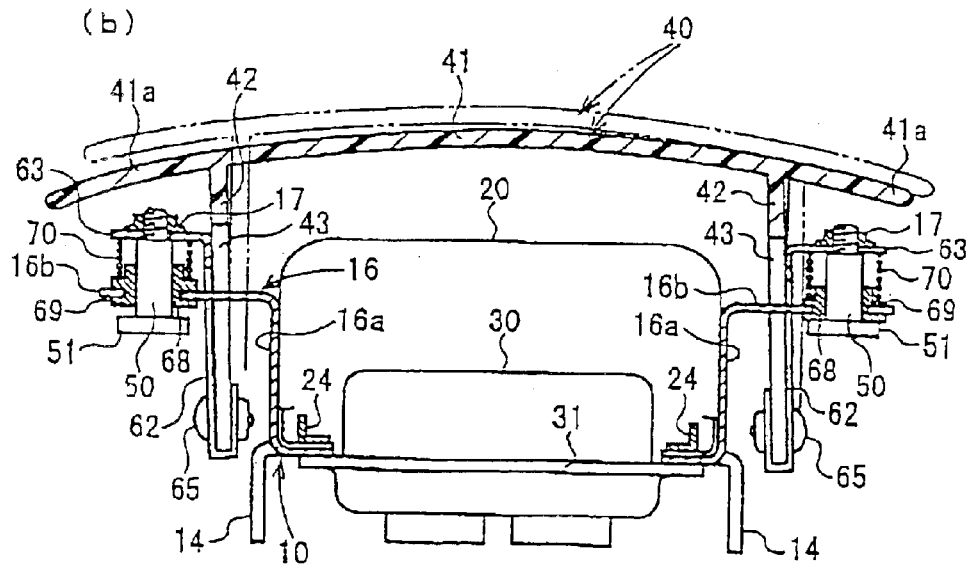

AIRBAG APPARATUS

BACKGROUND OF THE INVENTION

The present invention relates to airbag apparatuses having horn switches, and more specifically relates to an airbag apparatus constructed such that only a module cover moves to turn on the horn switches when the module cover is pressed.

A driver airbag apparatus which is disposed in a steering wheel of a vehicle and in which horn switches are turned on and a horn is sounded when a module cover of the airbag apparatus is pressed is known in the art. If this airbag apparatus is constructed such that only the module cover moves instead of the entire body of the airbag apparatus, as described in Japanese Unexamined Patent Application Publication No. 10-100832, and Japanese Unexamined Patent Application Publication No. 2001-114057 (both incorporated by reference), the horn switches can be turned on with a small pressing force. In such an airbag apparatus, the module cover is latched to a retainer by hooks provided on the retainer.

In driver airbag apparatuses, when an inflator is activated to inflate an airbag and the module cover breaks along a tear line, a large force which tries to remove the module cover away from the retainer is applied to the module cover.

In the airbag apparatus constructed such that the module cover can move with respect to the retainer and is latched by hooks provided on the retainer, the module cover has a projecting portion with a large thickness so that it can bear the large load applied when the airbag is inflated.

SUMMARY OF THE INVENTION

An object of the present invention is to provide an airbag apparatus having a module cover which can bear the large load applied when an airbag is inflated even if the thickness of a projecting portion is not large.

An airbag apparatus according to the present invention includes an airbag; a retainer to which the airbag is attached; a module cover which covers the airbag, which can move backward toward the retainer, and which has a projecting portion on the back surface thereof; and horn switches which are turned on when the module cover moves backward. A reinforcing member is attached to the projecting portion, the reinforcing member having protruding tabs which are continuous with the reinforcing member and which face the back surface of the module cover at a peripheral region around the projecting portion. In addition, the retainer has brackets which extend from the retainer and which face the protruding tabs, and the horn switches are interposed between the protruding tabs and the brackets.

In this airbag apparatus, when the inflator is activated to open the module cover and a large load is applied to the projecting portion of the module cover, the projecting portion can reliably bear the load even if the thickness thereof is not large since the reinforcing member is attached to the projecting portion. In addition, if the reinforcing member is attached to a relatively thick projecting portion, the strength and rigidity of the reinforcing member can be considerably increased.

According to the present invention, the reinforcing member may extend along the end edge of the projecting portion and the protruding tabs may be integral with the reinforcing member. In such a case, the protruding tabs extend upright from the reinforcing member like ribs, so that the strength and rigidity of the reinforcing member can be increased. In addition, since the protruding tabs are integral with the reinforcing member, the protruding tabs can be attached to the projecting portion simply by attaching the reinforcing member to the projecting portion. Thus, the airbag apparatus can be easily assembled. In addition, the accuracy of the attachment positions of the protruding tabs can be increased.

According to the present invention, preferably, each protruding tab is arranged between the bracket corresponding to the protruding tab and the back surface of the module cover, an elastic member being interposed between the bracket and the protruding tab and urging the bracket and the protruding tab away from each other, a guide shaft for guiding the backward movement of the module cover being fixed to one of the bracket and the protruding tab and extending through a guide-shaft-insertion hole provided in the other one of the bracket and the protruding tab, and a stopper being provided on the guide shaft so that the other one of the bracket and the protruding tab is prevented from being released from the guide shaft. In such a case, when the inflator is activated and a large force which tries to remove the module cover away from the retainer is applied to the module cover, the module cover is reliably retained by the retainer due to the brackets and the guide shafts. A similar effect can also be obtained when each bracket and its corresponding protruding tab are connected to each other with a leaf spring.

In addition, according to the present invention, a point around which the module cover tilts and the peripheral edge of the module cover are preferably at approximately the same height from the retainer in the direction of the backward movement of the module cover. The approximately the same height means that the difference between the distance from the retainer to the protruding tabs and that from the retainer to the peripheral edge of the module cover in the direction of the backward movement of the module cover is in the range of, for example, 0 to 10 mm.

When the module cover is pressed at one end thereof to turn on the horn switches, the module cover tilts around the protruding tab at the other end. However, if the airbag apparatus is constructed as described above, since the protruding tabs and the peripheral edge of the module cover are at approximately the same height from the retainer in the direction of the backward movement of the module cover, the sideways displacement of the peripheral edge of the module cover due to the tilting of the module cover is small. More specifically, as the difference between the heights of the point around which the module cover tilts and the peripheral edge of the module cover from the retainer decreases, the sideways displacement of the peripheral edge of the module cover decreases.

Therefore, in the steering wheel containing the airbag apparatus which is constructed as described above, the clearance between the module cover and a peripheral portion around the module cover can be reduced. Accordingly, the clearance between the module cover and the peripheral portion around the module cover becomes less visible, and the appearance of the steering wheel having the airbag apparatus can thus be improved.

According to the airbag apparatus of the present invention, only the module cover moves to turn on the horn switches and the module cover can be reliably retained by the retainer when the airbag is inflated.

It is to be understood that both the foregoing general description and the following detailed description are exemplary and exemplary only, and are not restrictive of the invention as claimed

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 5(a) and (b) show sectional views of the airbag apparatus shown in FIG. 1 and the airbag apparatus shown in FIG. 4 in the state in which a module cover is pressed at one end thereof.

DETAILED DESCRIPTION

Figure 1:
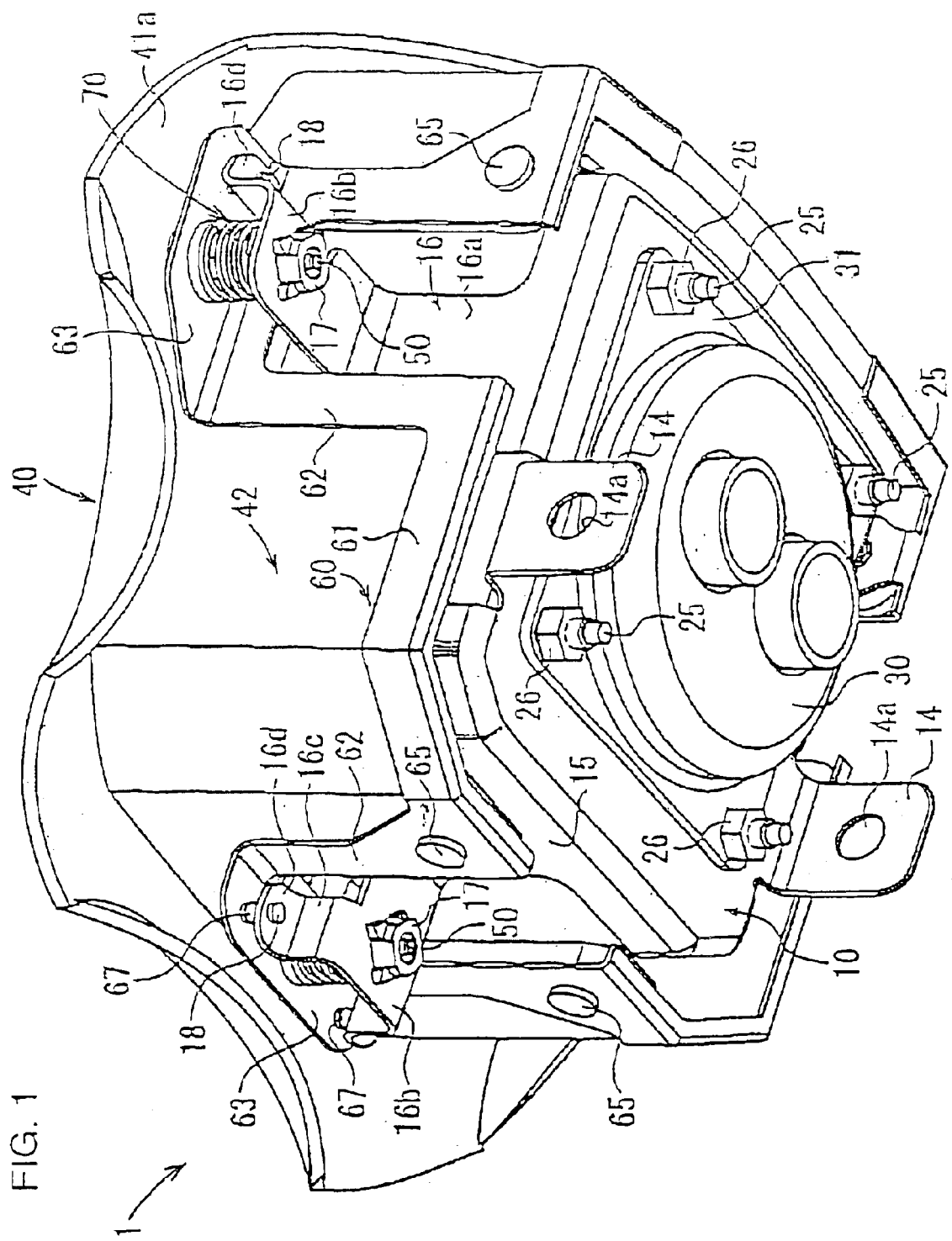
FIG. 1 is a perspective view of an airbag apparatus according to an embodiment.
Figure 2:
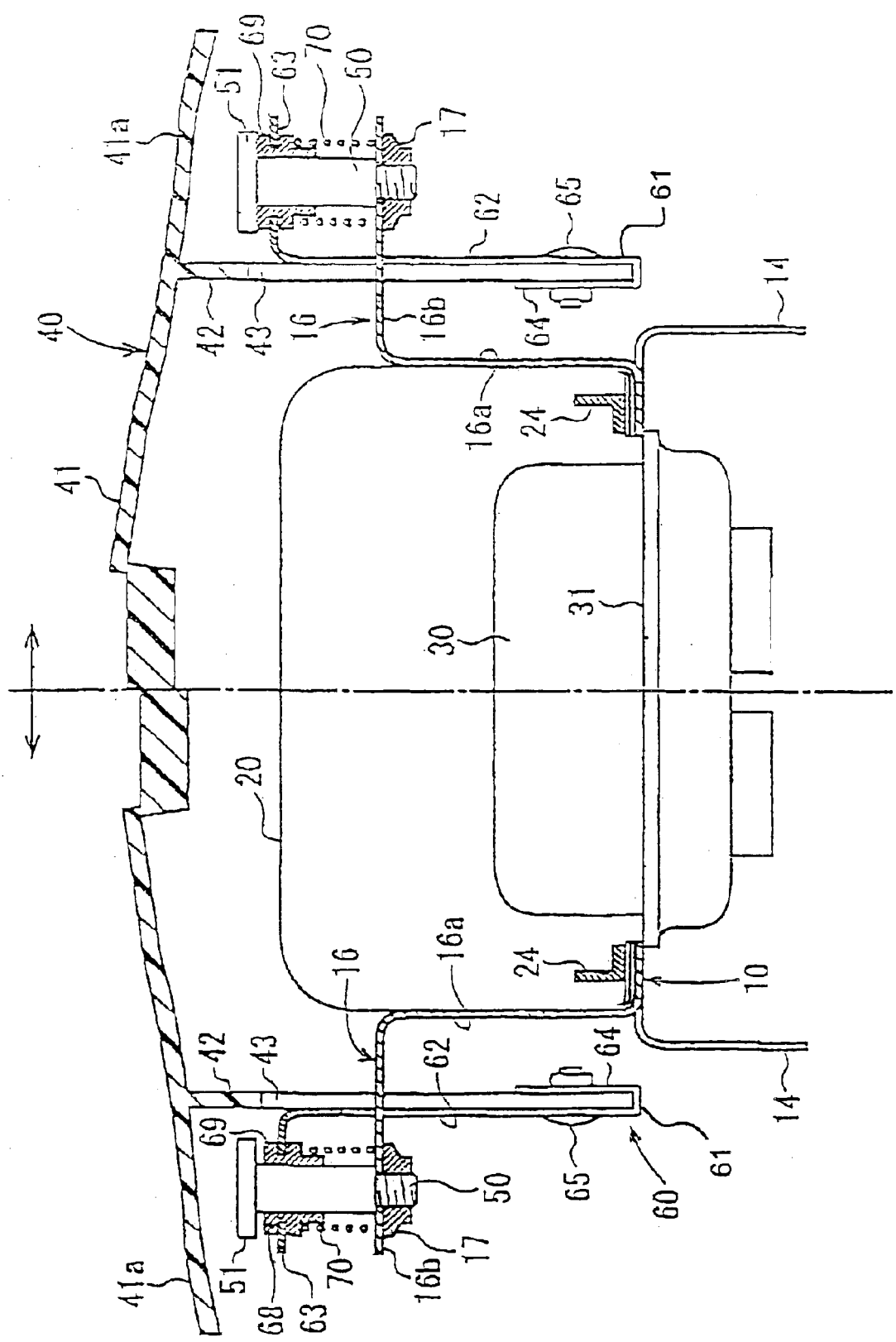
FIG. 2 is a sectional view of the airbag apparatus according to an embodiment.
Figure 3:
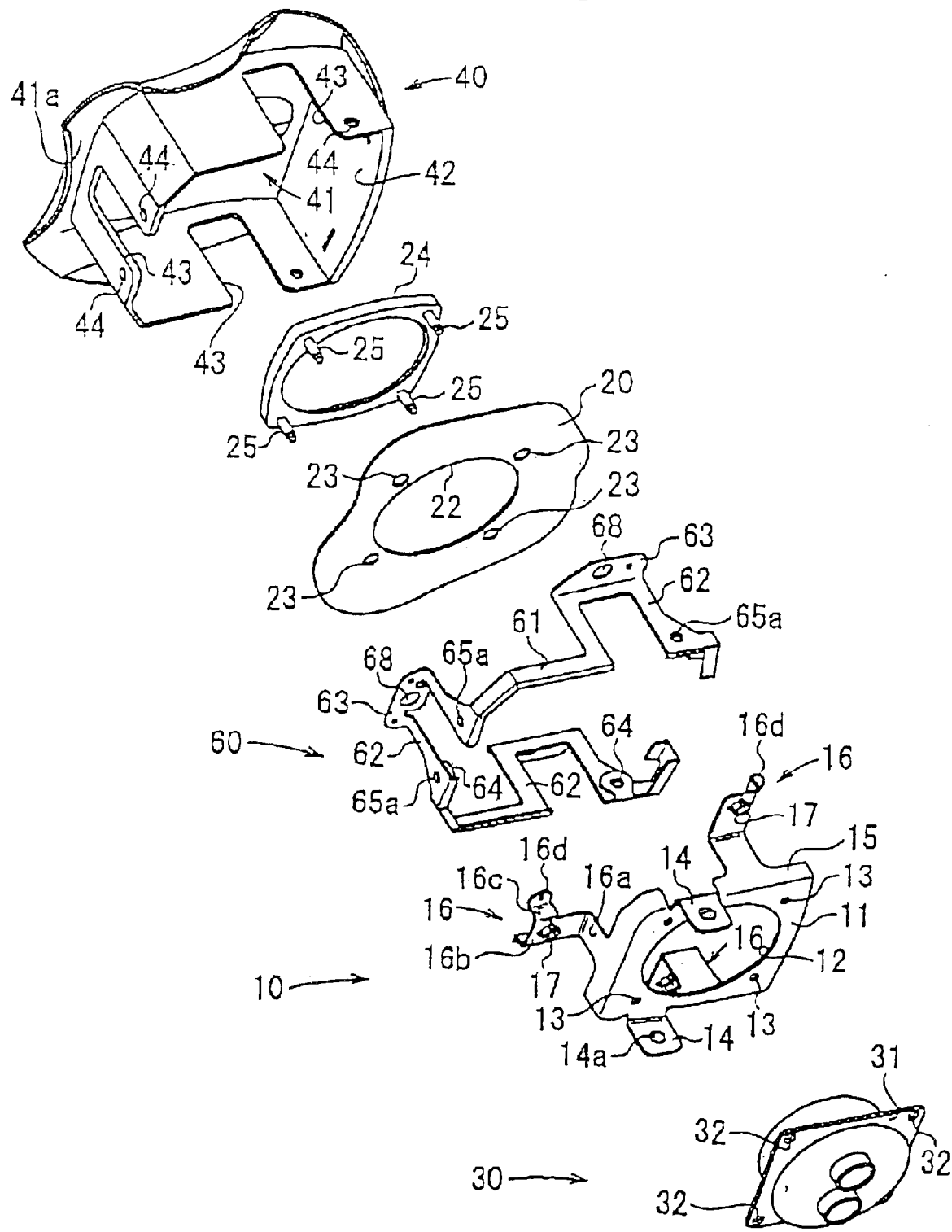
FIG. 3 is an exploded perspective view of the airbag apparatus according to an embodiment.

Embodiments of the present invention will be described below with reference to the accompanying drawings. FIG. 1 is a perspective view of an airbag apparatus according to an embodiment as seen from below, FIG. 2 is a vertical sectional view of the airbag apparatus cut along the width thereof, and FIG. 3 is an exploded perspective view of the airbag apparatus. In FIG. 2, the right half shows an "unpressed" state in which a module cover 40 is not pressed, and the left half shows a "cover pressed" state in which the module cover 40 is pressed and a horn is sounded.

An airbag apparatus 1 is a driver airbag apparatus disposed in the central region of a steering wheel. The airbag apparatus 1 includes a metal retainer 10, an airbag 20 which is attached to the retainer 10 with an airbag attachment ring 24, an inflator 30 for inflating the airbag 20, a module cover 40 composed of synthetic resin which covers the airbag 20 in a folded state, etc. The module cover 40 has a groove-shaped tear line. When the airbag 20 is inflated by the inflator 30, the module cover 40 breaks along the tear line. Although only the outline of the airbag 20 is shown in FIG. 2, the airbag 20 is actually folded. In addition, although only a portion of the airbag 20 around an inflator-insertion hole 22 is shown in FIG. 3, the airbag 20 actually has a bag shape and is large enough to expand to the front of an occupant.

As shown in FIG. 3, the retainer 10 has a rectangular main plate 11, and an opening 12 for receiving the inflator 30 is formed in the main plate 11. In addition, insertion holes 13 for receiving stud bolts 25 provided on the airbag attachment ring 24 are provided in a peripheral region around the opening 12.

The main plate 11 of the retainer 10 is provided with anchor tabs 14 which project downward in the figure (in the direction away from the occupant) from the periphery of the main plate 11. The anchor tabs 14 are used for attaching the airbag apparatus 1 to a steering wheel. Each anchor tab 14 is provided with a hole 14a for receiving a bolt or the like.

The main plate 11 of the retainer 10 is also provided with a surrounding wall portion 15 which stands upward in the figure (in the direction toward the occupant) along almost the entire periphery of the main plate 11 (excluding the regions where the anchor tabs 14 are provided). Brackets 16 are provided integrally with the retainer 10 at three sides of the surrounding wall portion 15, that is, the left, right, and bottom sides as seen from the occupant.

Each bracket 16 includes a base portion 16a which projects from the surrounding wall portion 15 in the direction toward which the surrounding wall portion 15 stands (in the direction toward the occupant) and an extending portion 16b which extends sideways from the end of the base portion 16a (sideways with respect to the airbag apparatus 1).

A metal nut 17 into which a metal guide shaft 50 is screwed is fixed to each extending portion 16b by welding.

Each extending portion 16b has one or two upright portions 16c which extend toward the occupant, and each upright portion 16c has a tab portion 16d which protrudes sideways form the upper end of the upright portion 16c. Each tab portion 16d faces toward the bottom surface of a peripheral portion 41a of the module cover 40, and a contact member 18 for a horn switch (see FIG. 1) is fixed to each tab portion 16d.

A portion of the airbag 20 around the inflator insertion hole 22 is placed on a portion of the main plate 11 of the retainer 10 around the opening 12 for receiving the inflator 30, and then the airbag attachment ring 24 is placed thereon. The stud bolts 25 are inserted through bolt-insertion holes 23 provided in the airbag 20 in the peripheral region around the inflator-insertion hole 22 and the bolt-insertion holes 13 provided in the retainer 10. Then, the stud bolts 25 are inserted through bolt-insertion holes 32 provided in a flange 31 of the inflator 30, and nuts 26 are fastened to the stud bolts 25 (see FIG. 1). Accordingly, the airbag 20 and the inflator 30 are attached to the retainer 10.

A module cover 40 includes a projecting portion 42 which is provided with notches 43, and a reinforcing member 60 is fixed to the projection portion 42 with rivets 65. Protruding tabs 63 are provided integrally with the reinforcing member 60, and brackets 16 are provided integrally with a retainer 10. Horn switches are interposed between extending portions 16b of the brackets 16 and the protruding tabs 63.

The module cover 40 includes a main plate 41 which faces the occupant and a projecting portion 42 which projects from the bottom surface of the main plate 41. The projecting portion 42 is formed integrally with the main plate 41 by injection molding of synthetic resin, and has a rectangular frame shape so as to surround the outer sides of the surrounding wall portion 15 of the retainer 10. The peripheral portion 41a of the main plate 41 expands outward beyond the projecting portion 42.

The rectangular-frame-shaped projecting portion 42 is provided with three notches 43, one on each of the three sides thereof (the left, right, and bottom sides as seen from the occupant), the notches 43 being cut in the end edge of the projecting portion 42. The notches 43 are formed so as to receive the extending portions 16b of the brackets 16. In addition, rivet holes 44 are formed in the projecting portion 42.

A reinforcing member 60 composed of metal is attached to the projecting portion 42. The reinforcing member 60 includes a base portion 61 which extends along the end edge of the projecting portion 42 so that the base portion 61 can be fitted around the projecting portion 42 at the end thereof, gate-shaped portions 62 which extend from the base portion 61 toward the occupant along the outer sides of the projecting portion 42, protruding tabs 63 which protrude sideways from the gate-shaped portions 62 (sideways with respect to the airbag apparatus 1), and attachment tabs 64 which extend from the base portion 61 along the inner sides of the projecting portion 42. The base portion 61 is provided with rivet holes 65a, and the attachment tabs 64 are also provided with rivet holes such that the rivet holes in the attachment tabs 64 face the rivet holes 65a.

The base portion 61 is L-shaped in cross section such that it overlaps the outer sides of the projecting portion 42 at the end of the projecting portion 42 and extends around to the end surface of the projecting portion 42. The reinforcing member 60 and the projecting portion 42 are positioned with respect to each other by bringing the base portion 61 in contact with the end surface of the projecting portion 42. The projecting portion 42 is fixed to the reinforcing member 60 by inserting the projecting portion 42 between the base portion 61 and the attachment tabs 64 and inserting rivets 65 through the rivet holes 44 and 65a.

The gate-shaped portions 62 have a bracket shape, and the shape and position of the inner sides of each gate-shaped portion 62 are determined such that the inner sides of the gate-shaped portion 62 coincides with the inner sides of its corresponding notch 43. The extending portions 16b of the brackets 16 are disposed in the gate-shaped portions 62.

One or two contact members 67 for the horn switches (see FIG. 1) are fixed to each of the protruding tabs 63 which protrude from the upper ends of the gate-shaped portions 62. In addition, each protruding tab 63 is provided with an insertion hole 68 for receiving the guide shaft 50.

As shown in FIG. 2, the lower end of each guide shaft 50 is screwed into its corresponding nut 17 provided on the extending portion 16b, and is thereby fixed to the extending portion 16b. Thus, the guide shaft 50 stands upright from the extending portion 16b toward the occupant. In addition, the guide shaft 50 is provided with a flange 51 which serves as a stopper at the upper end thereof. A guide bushing 69 composed of an electrically insulating material with high sliding performance, such as synthetic resin, is fitted in and fixed to the guide-shaft-insertion hole 68 formed in each protruding tab 63, and the guide shaft 50 is slidably inserted through the guide bushing 69. The upper end portion of the guide bushing 69 is interposed between the flange 51 of the guide shaft 50 and the protruding tab 63, so that the guide shaft 50 and the protruding tab 63 are insulated from each other.

A coil spring 70 is disposed between the guide bushing 69 and the extending portion 16b of the bracket 16. The coil spring 70 is disposed so as to surround the guide shaft 50. The guide bushing 69 has a step portion in the lower region thereof, the guide bushing 69 having a smaller diameter in a region below the step portion than in a region above the step portion, and the coil spring 70 is engaged with the step portion. Accordingly, the coil spring 70 is not in contact with the protruding tab 63, so that the protruding tab 63 and the extending portion 16b are insulated from each other.

As shown in the right half of FIG. 2, the flange 51 and the guide bushing 69 are in contact with each other due to the pressing force applied by the coil spring 70. When the module cover 40 is pressed, the module cover 40 moves backward, as shown in the left half of FIG. 2, and the contact members 67 come into contact with their corresponding contact members 18. The horn switches are constructed of the guide shafts 50, the guide bushings 69, the coil springs 70 and the contact members 18 and 67.

In the airbag apparatus 1 which is constructed as described above, when the module cover 40 is pressed, the module cover 40 moves backward together with the reinforcing member 60 while being guided by the guide shafts 50, and the contact members 67 come into contact with their corresponding contact members 18. Accordingly, the horn switches are turned on and a horn is sounded. When the module cover 40 is released, it is pushed upward due to the repulsive force applied by the coil springs 70.

When, for example, the vehicle collides, gas is discharged by the inflator 30 and the airbag 20 is inflated accordingly. The module cover 40 breaks along the tear line and the airbag 20 expands into the vehicle cabin to cushion the occupant.

When the airbag 20 is inflated, a large load is applied to the projecting portion 42 in the upward direction in FIG. 2. Although the module cover 40 tries to move upward in FIG. 2 due to this load, the projecting portion 42 is prevented from moving upward since the guide bushings 69 and the protruding tabs 63 are stopped by the flanges (stoppers) 51 of the guide shafts 50.

The guide shafts 50 are strongly fixed to the metal brackets 16 with the nuts 17, and the brackets 16 are integral with the retainer 10. In addition, the protruding tabs 63 are integral with the metal reinforcing member 60 and are strongly connected to the projecting portion 42 due to the gate-shaped portions 62, the base portion 61, and the rivets 65. Accordingly, the load applied to the projecting portion 42 is transmitted to the retainer 10 via the reinforcing member 60, the guide shafts 50, and the brackets 16, all of which are composed of metal, so that the projecting portion 42 is reliably retained by the retainer 10.

In particular, according to the present embodiment, the reinforcing member 60 extends around almost the entire periphery of the projecting portion 42 having a rectangular frame shape. In addition, the reinforcing member 60 is fixed to the projecting portion 42 with a plurality of rivets 65 (four rivets are used in the present embodiment: one on each of the left and right sides and two on the bottom). Accordingly, and the reinforcing member 60 and the projecting portion 42 are strongly connected to each other. The connection strength between the projecting portion 42 and the reinforcing member 60 may also be increased by increasing the number of rivets as necessary. Since the reinforcing member 60 is connected to the projecting portion 42 such that it extends around the periphery of the projecting portion 42, the projecting portion 42 is reinforced by the reinforcing member 60. Accordingly, even when the thickness of the projecting portion 42 is reduced to some extent, it can reliably bear the load applied when the airbag 20 is inflated.

According to the present embodiment, the construction behind the module cover is simplified and the manufacturing cost of the module cover is reduced. In addition, the module cover can be attached to the retainer provided with the horn switches and the airbag, and the airbag apparatus can be easily assembled.

Figure 4:
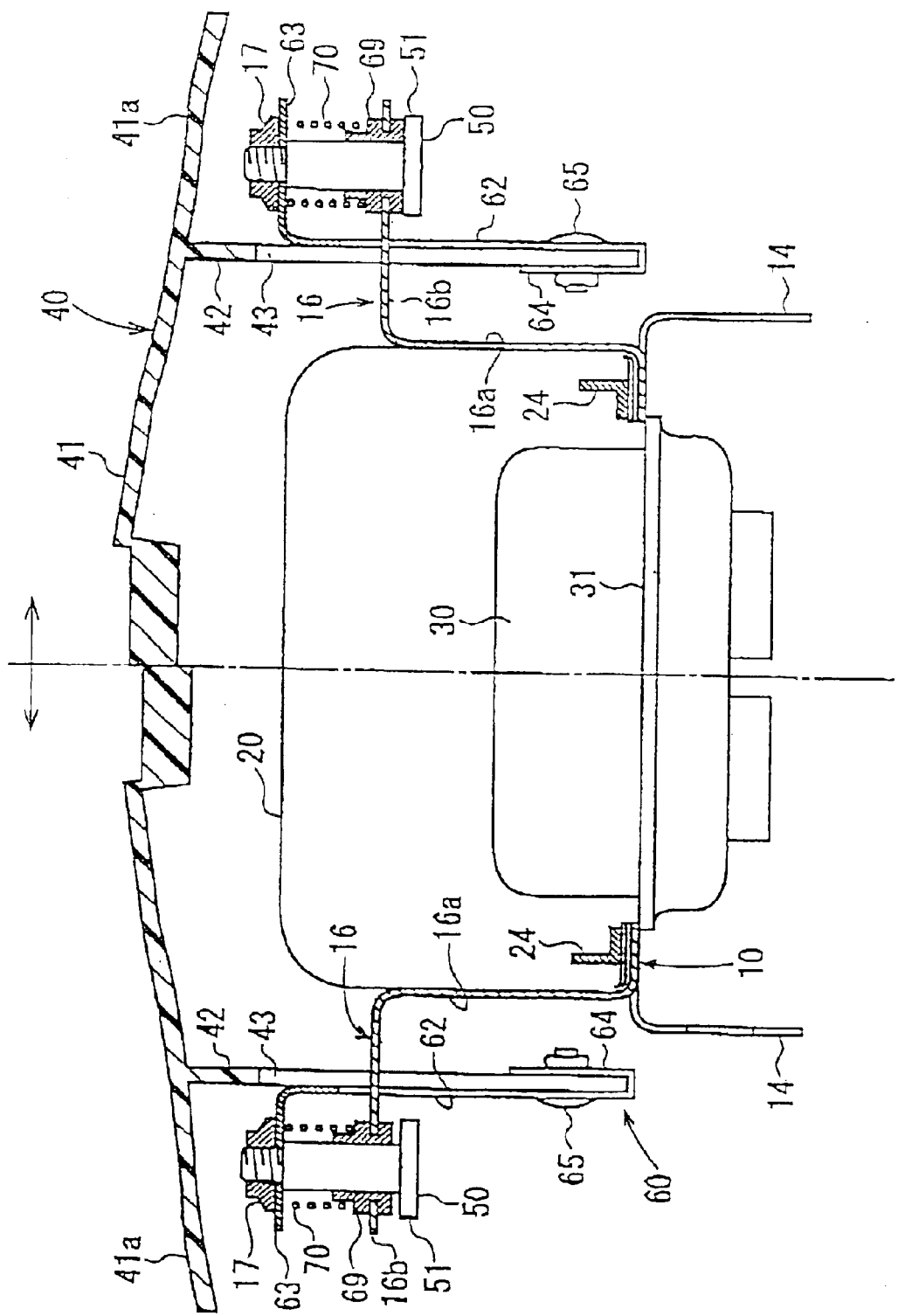
FIG. 4 is a sectional view of an airbag apparatus according to another embodiment.

With reference to FIG. 2, the guide shafts 50 are fixed to the extending portions 16b of the brackets 16, and are inserted through the guide-shaft-insertion holes 68 provided in the protruding tabs 63. However, as shown in FIG. 4, the guide shafts 50 may also be fixed to the protruding tabs 63, and be inserted through guide-shaft-insertion holes formed in the extending portions 16b. Similar to FIG. 2, the right half of FIG. 4 shows the state in which the module cover 40 is not pressed, and the left half of FIG. 4 shows the state in which the module cover 40 is pressed.

With reference to FIG. 4, each protruding tab 63 is provided with a hole for receiving a male-screw portion provided at the end of the guide shaft 50, and a metal nut 17 is fixed on the top surface of the protruding tab 63 by welding in such a manner that the metal nut 17 is coaxial with this hole.

In addition, a guide bushing 69 is fitted in and fixed to a guide-shaft-insertion hole provided in the extending portion 16b of each bracket 16. The guide shaft 50 is inserted through the guide-shaft-insertion hole provided in the extending portion 16b from below, and the male-screw portion at the end of the guide shaft 50 is screwed into the nut 17. A coil spring 70 is disposed between the protruding tab 63 and the guide bushing 69, and the guide shaft 50 is inserted through the coil spring 70. The coil spring 70 is engaged with a step portion which is provided on the guide bushing 69 composed of synthetic resin in the upper region thereof, and is not in contact with the extending portion 16*b*. The lower end portion of the guide bushing 69 is interposed between a flange 51 provided at the lower end of the guide shaft 50 and the extending portion 16*b*, so that the guide shaft 50 and the extending portion 16*b* are insulated from each other. Therefore, the extending portion 16*b* and the protruding tab 63 are also insulated from each other.

Other constructions of this embodiment are the same as those of the previous embodiment, and components similar to those of the previous embodiment are denoted by the same reference numerals.

Also in the present embodiment, when the module cover 40 is pressed, the module cover 40 moves downward, as shown in the left half of FIG. 4, and the contact members 67 come into contact with their corresponding contact members 18. Accordingly, the horn switches are turned on and a horn is sounded. When the module cover 40 is released, the module cover 40 returns to the state shown in the right half of FIG. 4 due to the repulsive force applied by the coil springs 70.

As shown in FIG. 5(*a*), in the airbag apparatus shown in FIGS. 1 to 3, when the module cover 40 is pressed at one end thereof (left end in FIG. 5(*a*)) to turn on the horn switches, the protruding tab 63 in the horn switch at this end moves downward along the guide shaft 50 against the force applied by the coil spring 70. In comparison, the protruding tab 63 in the horn switch at the other end of the module cover 40 (right end in FIG. 5(*a*)) is prevented from moving downward due to the force applied by the coil spring 70 and is pressed toward the flange 51 on the upper end of the guide shaft 50 from below with the guide bushing 69 interposed therebetween. Accordingly, the module cover 40 rotates such that the pressed end moves downward around a point near the upper end of the guide shaft 50 at the other end.

In addition, as shown in FIG. 5(*b*), in the airbag apparatus shown in FIG. 4, when the module cover 40 is pressed at one end thereof (left end in FIG. 5(*b*)) to turn on the horn switches, the protruding tab 63 in the horn switch at this end moves downward together with the guide shaft 50 against the force applied by the coil spring 70 while being guided by the guide shaft 50. In comparison, the protruding tab 63 in the horn switch at the other end of the module cover 40 (right end in FIG. 5(*b*)) is prevented from moving downward due to the force applied by the coil spring 70. Accordingly, the guide shaft 50 is also prevented from moving downward through the guide-shaft insertion hole 68 in the extending portion 16*b*, and the flange 51 at the lower end of the guide shaft 50 is pressed toward the extending portion 16*b* from below with the guide bushing 69 interposed therebetween. Accordingly, the module cover 40 rotates such that the pressed end moves downward around a point near the lower end of the guide shaft 50 at the other end.

As is clear from FIGS. 5(*a*) and 5(*b*), in the airbag apparatus shown in FIGS. 1 to 3 in which the module cover 40 rotates around a point near the upper end of the guide shaft 50, tilting of the module cover 40 and sideways displacement of the peripheral portion 41*a* of the module cover 40, which occur when the module cover 40 is pressed at one end thereof, are small compared to those in the airbag apparatus shown in FIG. 4 in which the module cover 40 rotates around a point near the lower end of the guide shafts 50. More specifically, as the difference between the heights of the point around which the module cover 40 tilts and the peripheral portion 41*a* of the module cover 40 from the retainer 10 in the direction of the backward movement of the module cover 40 decreases, the sideways displacement of the peripheral portion 41 a of the module cover 40 decreases.

Therefore, in the steering wheel (not shown) containing the airbag apparatus shown in FIGS. 1 to 3, the clearance between the module cover 40 and a peripheral portion around the module cover 40 can be reduced. Accordingly, the clearance between the module cover 40 and the peripheral portion around the module cover 40 becomes less visible, and the appearance of the steering wheel having the airbag apparatus can thus be improved.

The above-described embodiments simply show examples of the present invention, and various modifications are also possible. For example, the coil springs 70 and the guide shafts 50 may be replaced by leaf springs, and the protruding tabs 63 and their corresponding extending portions 16*b* may be connected to each other with the leaf springs. In addition, the contact members 18 and 67 may be replaced by pressure-sensitive conductive rubber members. In addition, the connection structure between the reinforcing member 60 and the projecting portion 42 is of course not limited to that shown in the figures.

The priority applications, Japanese Patent Application No. 2002-319996, filed on Nov. 1, 2002, and Japanese Patent Application No. 2003-326409, filed on Sep. 18, 2003, including the specification, drawings, claims and abstract, are incorporated herein by reference in their entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims

What is claimed is:

1. An airbag apparatus comprising:

an airbag;

a retainer to which the airbag is attached;

a module cover covering the airbag, and being configured to move backward toward the retainer, and which has a projecting portion on the back surface thereof; and horn switches which are turned on when the module cover moves backward, wherein a reinforcing member is attached to the projecting portion and covers an exposed end portion of the projecting portion, the reinforcing member having protruding tabs which are continuous with the reinforcing member and which face the back surface of the module cover at a peripheral region around the projecting portion, wherein the retainer has brackets which extend from the retainer and which face the protruding tabs, and wherein the horn switches are interposed between the protruding tabs and the brackets.

2. An airbag apparatus according to claim 1, wherein the reinforcing member extends along the end edge of the projecting portion, and wherein the protruding tabs are integral with the reinforcing member.

3. An airbag apparatus according to claim 1, wherein each protruding tab is arranged between the bracket corresponding to the protruding tab and the back surface of the module cover, an elastic member being interposed between the bracket and the protruding tab and urging the bracket and the protruding tab away from each other, a guide shaft for guiding the backward movement of the module cover being fixed to one of the bracket and the protruding tab and extending through a guide-shaft-insertion hole provided in the other one of the bracket and the protruding tab, and a stopper being provided on the guide shaft so that said other one of the bracket and the protruding tab is prevented from being released from the guide shaft.

4. An airbag apparatus according to claim 3, wherein a point around which the module cover tilts and the peripheral edge of the module cover are at approximately the same height from the retainer in the direction of the backward movement of the module cover.

5. An airbag apparatus according to claim 1, wherein each protruding tab is arranged between the bracket corresponding to the protruding tab and the back surface of the module cover, and a spring is positioned between the bracket and the protruding tab.

6. An airbag apparatus according to claim 4, wherein a point around which the module cover tilts and the peripheral edge of the module cover are at approximately the same height from the retainer in the direction of the backward movement of the module cover.

7. An airbag module comprising a cover configured to move to activate a horn switch;

wherein the cover includes a projecting portion connected to an airbag retainer, wherein the projecting portion is reinforced to prevent the projecting portion from separating from the retainers wherein the projecting portion is reinforced by a reinforcing member that covers an exposed end portion and a side portion of the projecting portion.

wherein the reinforcing member includes protruding tabs, and wherein the protruding tabs are continuous with the reinforcing member and face a back surface of the cover at a peripheral region around the projecting portion.

* * * * *